United States Patent
Luderich et al.

(10) Patent No.: US 6,902,468 B2
(45) Date of Patent: Jun. 7, 2005

(54) ASSEMBLY FOR MACHINING THE EDGES OF SPECTACLE LENSES

(75) Inventors: Joerg Luderich, Ratingen (DE); Fritz Kötting, Dormagen (DE); Ralf Werner, Hilden (DE)

(73) Assignee: WECO Optik GmbH (DE)

(*) Notice: Subject to any disclaimer, the term of this patent is extended or adjusted under 35 U.S.C. 154(b) by 2 days.

(21) Appl. No.: 10/221,944

(22) PCT Filed: Mar. 10, 2001

(86) PCT No.: PCT/EP01/02710
§ 371 (c)(1),
(2), (4) Date: Feb. 26, 2003

(87) PCT Pub. No.: WO01/70460
PCT Pub. Date: Sep. 27, 2001

(65) Prior Publication Data
US 2003/0157869 A1 Aug. 21, 2003

(30) Foreign Application Priority Data
Mar. 18, 2000 (DE) .......................... 100 13 648

(51) Int. Cl.⁷ .............................................. B24B 1/00
(52) U.S. Cl. ............................... 451/9; 451/11; 451/42; 451/256
(58) Field of Search ................................ 451/9, 10, 11, 451/42, 43, 255, 256, 54

(56) References Cited

U.S. PATENT DOCUMENTS

| | | | |
|---|---|---|---|
| 5,651,645 A | 7/1997 | Wawrzyniak et al. | 408/13 |
| 5,908,348 A * | 6/1999 | Gottschald | 451/5 |
| 6,250,989 B1 * | 6/2001 | Mizuno | 451/5 |
| 6,379,215 B1 * | 4/2002 | Mizuno et al. | 451/5 |
| 6,383,061 B1 * | 5/2002 | Mandler | 451/43 |
| 6,564,111 B1 * | 5/2003 | Gottschald | 700/95 |
| 6,588,898 B2 * | 7/2003 | Iwai et al. | 351/159 |

FOREIGN PATENT DOCUMENTS

| | | |
|---|---|---|
| DE | 4127094 | 2/1993 |
| DE | 4414784 | 11/1995 |
| DE | 29823464 | 6/1999 |
| DE | 19815728 | 10/1999 |
| EP | 0 717 671 | 7/1994 |

OTHER PUBLICATIONS

*Handbook of Ophthalmic Optics*, published by Carl Zeiss and revised by Dr. Helmut Goersch, 1997. English translation of German Handbook.

* cited by examiner

Primary Examiner—Eileen P. Morgan
(74) Attorney, Agent, or Firm—Ostrolenk, Faber, Gerb & Soffen, LLP

(57) ABSTRACT

The invention relates to an installation for the machining of the edges of spectacle lenses, comprising at least one CNC-controlled processing machine (1) for machining a spectacle lens, at least one device (3, 4) for determining the optical values, the optical focus, the axis position of a cylindrical or prismatic polish, the position of the near portion and/or the position of a progression channel of a spectacle lens (6) that is configured as a continuous vision lens. The installation also comprises at least one handling device (9) for removing blanks (6) from a conveyer device (8), for inserting a blank into the device, for removing said blank from said device, for introducing a blank into a respective processing machine, for removing a finished machined spectacle lens from the respective processing machine (1) and for replacing said lens on the conveyer device (8).

13 Claims, 2 Drawing Sheets

ASSEMBLY FOR MACHINING THE EDGES OF SPECTACLE LENSES

The invention relates to an installation for the machining of the edges of spectacle lenses with the aid of spectacle lens edge processing machines which comprise a slowly rotating spectacle lens holding shaft to grip a lens blank to be processed and an arrangement of polishing disks with its axis parallel thereto. The machining of spectacle lenses takes place by a method whereby the spectacle lens holding shaft is radially moved toward the arrangement of polishing disks and away therefrom, depending on the shape of the spectacle lens to be processed; this movement can take place as imitative processing by means of a shaped disk disposed on the spectacle lens holding shaft or may take place under CNC control and without a shaped disk by means of data stored in a control system.

The same applicant's DE 41 27 094 C2 describes an installation for the polishing of the optical surfaces and/or the circumferential edges of spectacle lenses, comprising at least one polishing disk, at least one rotatable mounting for a lens blank, at least one device for controlling polishing in accordance with presettable optical values and/or a presettable outline shape of the spectacle lens, at least one apparatus for inputting the optical values of the spectacle lenses and/or the decentering values of the predetermined outline shape and/or the axial position and/or the position of the near portion with reference to the optical axis of a lens blank to be polished and at least one control device connected to the input apparatus, wherein at least one CNC-controlled handling appliance connected to the control device is provided for picking up and positioning the lens blank in accordance with the values input into the input apparatus and for inserting the lens blank in the mounting accordingly with precise positioning. By means of this handling appliance, a lens blank to be machined can in each case be inserted into a spectacle lens edge processing machine, is processed there and is then removed again from the spectacle lens edge processing machine. As it is usually necessary to produce a right-hand and a left-hand spectacle lens, the corresponding lens blanks are inserted consecutively into the spectacle lens edge processing machine and removed again after processing. Although this publication also describes a plurality of spectacle lens edge processing machines disposed side by side, there is no reference therein to the edge processing of the left-hand and right-hand spectacle lenses in different machines.

The same applicant's DE 44 14 784 C2 likewise describes an installation for polishing the circumferential edges and/or optical surfaces of spectacle lenses, comprising at least one polishing disk, at least one rotatable mounting for a lens blank, at least one device for the CNC-controlled polishing of the lens blank in accordance with a presettable outline shape of the spectacle lens, at least one input apparatus, connected to the control device, for inputting the optical values of the finished spectacle lens such as the axial position of a cylindrical or prismatic polish and/or the position of a near portion and/or the decentering values of the predetermined outline shape with reference to the optical axis of the lens blank, in which at least one handling appliance for picking up and positioning the lens blank in accordance with the values input into the input apparatus and a detection device disposed in the working region of the handling appliance and consisting of a mounting for the lens blank, an illumination device for the lens blank mounted on the mounting and an opto-electronic scanning apparatus with an electronic image processing and analysis system for identifying customary markings such as dots, crosses and notches on the edge of the lens blank or the position of an existing near portion and a control device for the handling appliance for the positionally accurate insertion of the lens blank into the mounting in accordance with the markings recorded by the detection device are provided.

A lens blank marked with dots, crosses, notches on the circumferential edge and/or at least one clearly defined near portion is inserted by means of the handling appliance or by hand into the mounting of the detection device, whereupon the detection device, in the form of a CCD camera, records an image of the lens blank, evaluates by means of the electronic image processing and analysis system whether signals relating to the axial position of a cylindrical or prismatic polish and/or the position of a near portion are determined and input into the control device for the handling appliance. The handling appliance then picks up the lens blank in the correct position for said optical values and/or the decentering values and inserts the lens blank in accordance with those values into the mounting of a spectacle lens edge polishing machine, which then automatically performs the polishing to shape of the lens blank under CNC control.

The handling appliance comprises a movable recorder with a single suction cup to introduce the lens blanks into the detection device and a plurality of suction cups disposed in a curve to transfer the lens blanks from the detection device into the rotatable mounting, a central reception between the half-shafts of the rotatable mounting being ensured by the suction cups disposed in a curve.

By means of this known installation, the left-hand and right-hand spectacle lenses are picked up consecutively by the handling appliance, introduced into the spectacle lens edge processing machine in the working region of the handling appliance and removed therefrom.

The same applicant's DE 298 23 464.5 U1 describes an installation for the machining of the edges of spectacle lenses with a processing machine for the machining of a left-hand spectacle lens, a processing machine for the machining of a right-hand spectacle lens, a conveyor device disposed between the two processing machines for lens blanks and finished lenses, at least one handling appliance movably disposed between the conveyor device and the two processing machines for removing lens blanks from the conveyor device, for inserting one lens blank into each processing machine, for removing one finished spectacle lens from each processing machine and for returning them to the conveyor device. As a result of the conveyor device disposed between the two processing machines, the two lens blanks to be processed are transferred into the region of the handling appliance, picked up by the handling appliance, introduced into the two processing machines and processed simultaneously, so that the lens blanks need not be inserted by hand into the spectacle lens edge processing machines, nor is time wasted on processing a left-hand and a right-hand spectacle lens.

When the lens blanks are provided with a block or suction cup in a conventional centering appliance, accurately positioned and in each case in accordance with the decentering for a left-hand and a right-hand spectacle lens, the angular position of a prismatic or cylindrical polish and/or the position of a near portion and are disposed in the transport boxes in the correct position relative to the receiving position of the spectacle lens holding shafts in the spectacle lens edge processing machines, the handling appliances need only to pick up the lens blanks and insert them into the spectacle lens holding shafts in accordance with the received position, so that the handling appliances need to perform only simple, constantly repeated movements.

Instead of lens blanks with attached blocks or suction cups being inserted in the transport boxes, lens blanks without blocks or suction cups attached thereto may be inserted in the transport boxes if the handling appliances comprise corresponding suction cups which hold the lens blanks firmly and insert them into the spectacle lens holding shaft for processing. If the handling appliances comprise sensors for identifying machine-readable markings on the lens blanks, the lens blanks can also be disposed in any desired position in the transport boxes if the handling appliances, in this case, are provided with a control device which ensures that the lens blanks are inserted into the spectacle lens holding shaft in the correct position in accordance with the machine-readable markings or transmit signals to the spectacle lens edge polishing machines in order to control the edge processing in accordance with the position of the lens blanks in the spectacle lens holding shafts.

In all cases, however, the positionally accurate placement of a block or suction cup or the displaying of machine-readable markings is necessary, and the lens blanks have to be picked up by the handling appliance with the appropriate alignment or the handling appliance has to be inserted in the correct orientation in the spectacle lens edge processing machine, as a result of which additional effort is incurred and additional time may be lost in the edge processing of the lens blanks.

It is an object of the present invention to accelerate the production of spectacle lenses for spectacle frames, especially of left-hand and right-hand spectacle lenses, to simplify the manipulations associated therewith and to reduce the amount of equipment and control required.

On the basis of the stated object, an installation for the machining of the edges of spectacle lenses is proposed which, according to the invention, comprises at least one CNC-controlled processing machine for machining a spectacle lens, at least one apparatus for determining the optical values, the optical focus, the axial position of a cylindrical or prismatic polish, the position of a near portion and/or the position of the progression channel of a spectacle lens configured as a progressive lens, at least one handling appliance for the removal of lens blanks from a conveyor device, for the insertion of a lens blank into the apparatus, for removal from the apparatus, for insertion into the processing machine, for removing a finished spectacle lens from the processing machine and bringing it back to the conveyor device, wherein the at least one apparatus is in data connection with at least one processing machine and the data on the lens blank recorded by the apparatus are used in the positionally and angularly accurate, CNC-controlled edge machining of the lens blank by the processing machine, or the at least one apparatus is provided with, in each case, a device for placing a block or suction cup on the lens blank in the correct position and at the correct angle as a function of the recorded data on the lens blank.

If the at least one apparatus is in data connection with the at least one processing machine and the data on the lens blank recorded by the apparatus are used in the positionally and angularly accurate, CNC-controlled edge machining of the lens blank by the processing machine, or the at least one apparatus is provided with, in each case, a device for placing a block or suction cup on the lens blank (6) in the correct position and at the correct angle as a function of the recorded data on the lens blank (6), the handling appliance needs only to pick up the lens blank from the conveyor device, insert it into the apparatus for determining the optical values, the optical focus, the axial position of a cylindrical or prismatic polish, the position of a near portion and/or the position of the progression channel of a spectacle lens configured as a progressive lens, remove it therefrom once again and insert it into the at least one processing machine for machining the spectacle lens, the processing machine either taking direct account for computational purposes of the data recorded by the apparatus or picking up the lens blank in the correct position and at the correct angle with the aid of the positionally and angularly correct block or suction cup and then processing the lens blank.

The handling appliance thus requires no elaborate control systems, but is a simple "pick-and-place" robot. The apparatus for determining the optical values, etc., generates a corresponding data set, so that it is possible to pass these values on via a data link to the processing machine, as a result of which the data on the lens blanks recorded by the apparatus for determining the optical values, etc., are taken into account in the positionally and angularly accurate, CNC-controlled edge processing of the lens blanks by the processing machine, without it being necessary to insert the lens blanks with positional and angular accuracy into the spectacle lens holding shaft of the spectacle lens processing machine.

If the apparatus for determining the optical values, etc., is provided in each case with a device for the positionally and angularly correct placement of a block or suction cup on the lens blank as a function of the recorded data on the lens blank, a data link to the processing machine is not necessary, because in this case the placed block or suction cup determines the position and the angle of the lens blank on the spectacle lens holding shaft.

This means that only the apparatus for determining the optical values, the optical focus, the axial position of a cylindrical or prismatic polish, the position of a near portion and/or the position of the progression channel of a spectacle lens configured as a progressive lens and the processing machine need to be "intelligent", whereas the handling appliance does not. As a result, the control effort is very substantially reduced and the procedure accelerated.

The installation for machining the edges of spectacle lenses may comprise a processing machine for machining a left-hand spectacle lens, a processing machine for machining a right-hand spectacle lens, a conveyor device for lens blanks and finished lenses disposed between the two processing machines, at least one apparatus for determining the optical values, the optical focus, the axial position of a cylindrical or prismatic polish, the position of a near portion and/or the position of the progression channel of a spectacle lens configured as a progressive lens, at least one handling appliance, movably disposed between the conveyor device and the two processing machines, for the removal of lens blanks from the conveyor device, for the insertion of a lens blank into the apparatus, for removal from the apparatus, for insertion into a respective processing machine, for the removal of in each case one finished spectacle lens from a respective processing machine and for bringing it back to the conveyor device.

The conveyor device disposed between the two processing machines transports the two lens blanks to be processed into the region of the handling appliance, removes them from the handling appliance, brings them into the apparatus for determining the optical values, the optical focus, the axial position of a cylindrical or prismatic polish, the position of a near portion and/or the position of the progression channel of a spectacle lens configured as a progressive lens and then inserts them into the two processing machines and processes them simultaneously, so that neither is manual insertion of the lens blanks into the spectacle lens edge processing machines necessary nor is time lost when processing a left-hand and a right-hand spectacle lens. Preferably, a handling appliance may be movably disposed on a guide engaging over the processing machines in the manner of a portal, on which the handling appliance can be moved into the region of the processing machines and of the conveyor device in order to pick up lens blanks, insert them into the processing machines, and in order to remove the finished lenses from the processing machines and replace them on the conveyor device.

Preferably, one handling appliance can be provided for each processing machine between the conveyor device and the respective processing machine, these simultaneously picking up lens blanks, laying them in the apparatus for determining the optical values, the optical focus, the axial position of a cylindrical or prismatic polish, the position of a near portion and/or the position of the progression channel of a spectacle lens configured as a progressive lens, charging the processing machines, removing finished lenses from the processing machines and replacing them on the conveyor device. In this manner, no time is lost when the lens blanks are inserted and the finished lenses removed.

For bringing in the lens blanks and for removing the finished lenses, a conveyor belt may be disposed parallel to each of the two processing machines, while the conveyor device between the processing machines may likewise consist of a conveyor belt which is disposed at right angles to the other two conveyor belts. In this case, the lens blanks can be removed in pairs from a transport box transported by means of the conveyor belts and replaced therein by means of the handling appliances.

The processing machines may either be so disposed that the axes of the spectacle lens holding shafts extend parallel to one another and to the conveyor device, as a result of which the arrangement of the handling appliance is simplified, or the spectacle lens holding shafts of the two processing machines may extend coaxially with one another and at right angles to the conveying direction of the conveyor device, as a result of which the accessibility of the processing machines is improved.

Preferably, each processing machine may be assigned an apparatus for determining the optical values, the optical focus, the axial position of a cylindrical or prismatic polish, the position of a near portion and/or the position of the progression channel of a spectacle lens configured as a progressive lens, so that the determining of the optical values, etc., can take place simultaneously for a left-hand and a right-hand spectacle lens and thus no time is lost during the procedure. The apparatuses for determining the optical values may either be disposed, in each case, adjacent to the conveyor device or so disposed that the processing machines in each case lie adjacent to the conveyor device.

In both cases, the processing machines and the apparatuses for determining the optical values, etc., may preferably be disposed adjacent to one another and in alignment.

If the apparatuses for determining the optical values, etc., are in data connection with the handling appliance, the handling appliance can be controlled so that the data on the lens blanks recorded by the apparatuses for determining the optical values, etc., are used in the positionally and angularly accurate, CNC-controlled insertion of the lens blanks into the processing machines.

The invention is explained in more detail below with reference to two examples of embodiments shown in the drawings, in which.

Figure 1:
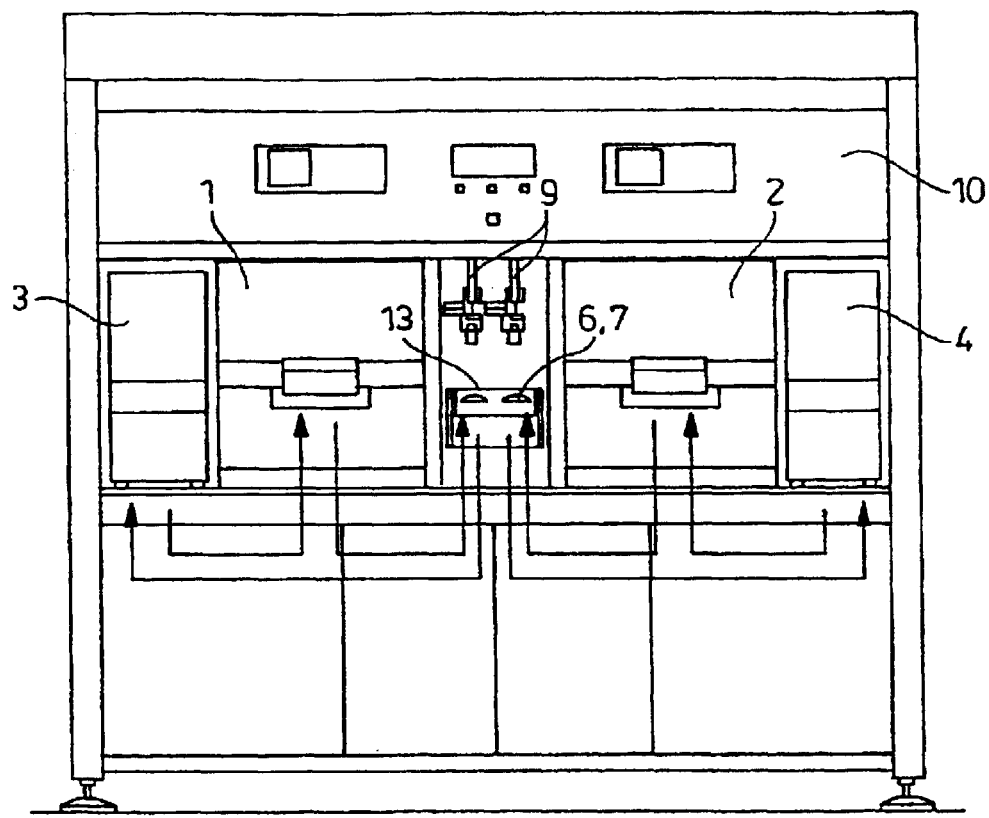
FIG. 1 shows a diagrammatic front view of the installation.

In the example of embodiment shown in FIG. 1, a spectacle lens edge processing machine 1 for a left-hand spectacle lens and a spectacle lens edge processing machine 2 for a right-hand spectacle lens are disposed opposite to one another, and their spectacle lens holding shafts extend coaxially with one another.

In the spectacle lens edge processing machines 1, 2, spectacle lens holding shafts are disposed, in a manner not shown in detail, in respective processing chambers of the spectacle lens edge processing machines 1 and 2 which chambers can in each case be closed by means of a folding lid.

For the processing of spectacle lenses made from silicate glass, diamond polishing disks (not shown) are used, liquid coolant being fed to the polishing gap between a lens blank 6 to be processed, which is clamped between the half-shafts, and a polishing disk (not shown).

For the processing of plastic lenses, milling cutters running at high revolutions or, again, polishing disks are used, the processing taking place either, again, with a liquid coolant feed or dry, depending on the type of plastic.

A conveyor device is disposed between the spectacle lens edge processing machines 1, 2, in the form of a conveyor belt 8 whose transport direction extends, in the example of embodiment shown, at right angles to the axes of the spectacle lens holding shafts 3, 4 and serves to bring in lens blanks 6 disposed in transport boxes and to remove finished lenses 7.

By means of the conveyor belt 8, one transport box 13 at a time is brought in and comes to a halt in the region of a pair of handling appliances 9 which are movable on a portal-like guide 10. A pair of lens blanks 6 is here picked up by the handling appliances 9 and inserted into apparatuses 3, 4 for determining the optical values, the optical focus, the axial position of a cylindrical or prismatic polish, the position of a near portion and/or the position of the progression channel of a lens blank 6 configured as a progressive lens. The values recorded by the apparatuses 3, 4 are transmitted as a data set, via a data link 5, to the spectacle lens edge processing machines 1, 2. These spectacle lens edge processing machines 1, 2 are CNC-controlled and are able to take account of the data transmitted by the apparatuses 3, 4 during the edge processing of the lens blanks 6.

After recording the optical values, etc., in the apparatuses 3, 4, the handling appliances 9 again pick up the lens blanks and insert them into the spectacle lens edge processing machines 1, 2 where they are machined to form a left-hand and a right-hand spectacle lens 7, respectively.

After completion of processing, the finished lenses 7 are removed by means of the pair of handling appliances 9 from the spectacle lens holding shafts of the spectacle lens edge processing machines 1, 2 and replaced in the transport boxes 13. Thereafter, the conveyor belt 8 is set in movement again and transports the transport boxes 13 with the finished lenses 7 into a further processing area, where the finished lenses are set in the appropriate spectacle frame.

In the example of embodiment shown, the handling appliances 9 comprise suction cups, not shown in detail, with the aid of which the lens blanks 6 can be picked up, placed between the spectacle lens holding shafts and clamped there.

In this case, positionally accurate alignment and angularly accurate insertion of the lens blanks 6 into the spectacle lens holding shafts is not necessary, and the handling appliances 9 need only perform simple, constantly repeated movements, because the data recorded in the apparatuses 3, 4 for determining the optical values, etc., and transmitted to the spectacle lens processing machines 1, 2 contain information on the position of the lens blanks 6 which is taken into account for computational purposes in the processing of these spectacle lenses.

If the spectacle lens processing machines 1, 2 are not CNC-controlled or do not permit a data link to the apparatuses 3, 4 for determining the optical values, etc., it is also possible to provide each of the apparatuses 3, 4 for determining the optical values with a device for the positionally and angularly correct placement of a block or suction cup on the lens blank as a function of the recorded data on the lens blanks. In this case, the handling appliances 9 pick up the lens blanks 6 on the blocks or suction cups fixed thereto in the apparatuses 3, 4 for determining the optical values, etc., and place them in the axially correct position in the spectacle lens holding shafts. As the conventional blocks or suction cups have seatings which are complementary to those of the spectacle lens holding shafts, it is sufficient if the spectacle lens holding shafts rotate slightly as they move together to clamp the lens blanks 6 provided with blocks or suction cups, in order to engage into the seatings, as a result of which the angular position of the lens blanks 6 relative to the spectacle lens holding shafts is also determined.

According to a further embodiment, a data link may be provided between the apparatuses 3, 4 for determining the optical values, etc., and the handling appliances 9. The data on the lens blanks 6 recorded by the apparatuses 3, 4 for determining the optical values, etc., are then taken into account for computational purposes in the handling appliances 9, in order to insert the lens blanks 6 with positional and angular accuracy in the processing machines 1, 2.

Figure 2:
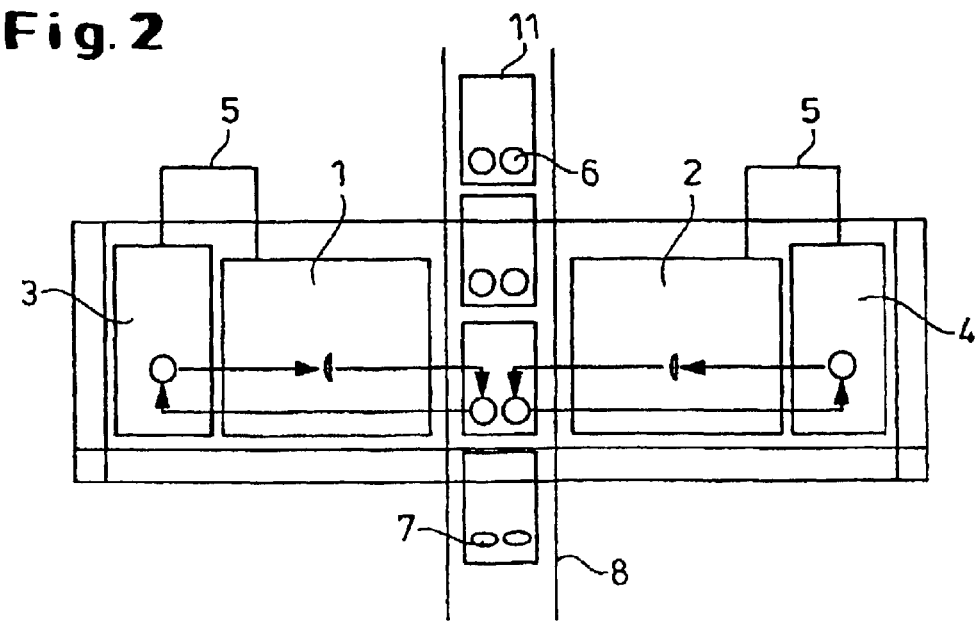
FIG. 2 shows a diagrammatic plan view of the installation in accordance with FIG. 1.
Figure 3:
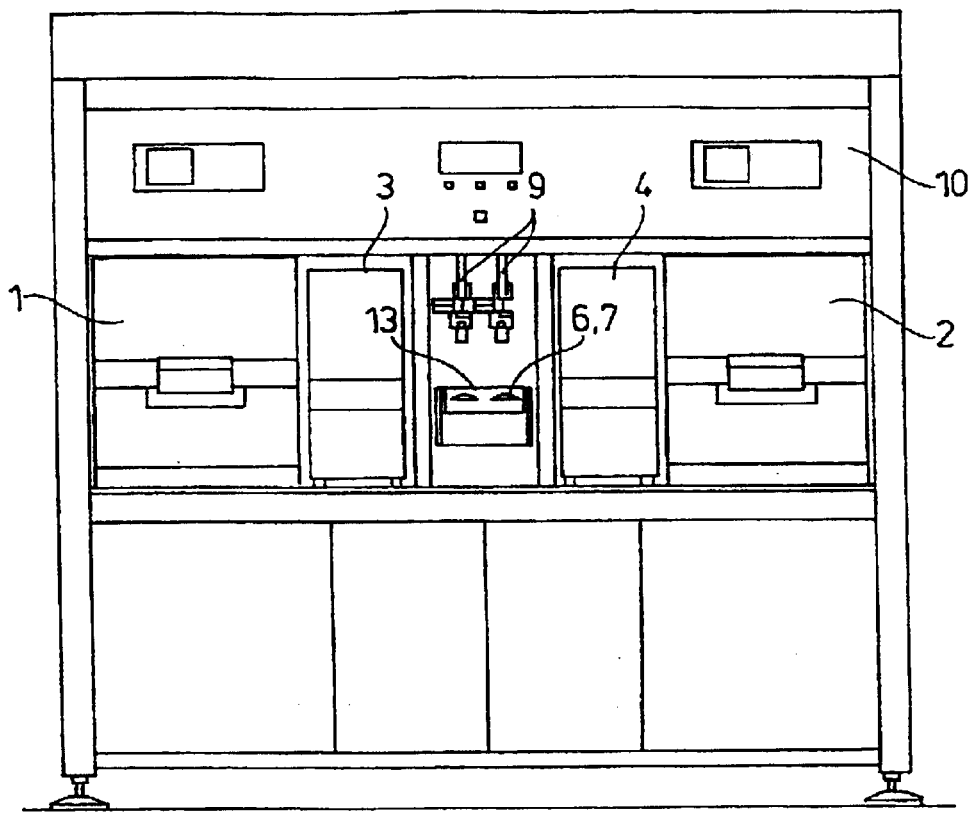
FIG. 3 shows a diagrammatic front view of a second embodiment of the installation.
Figure 4:
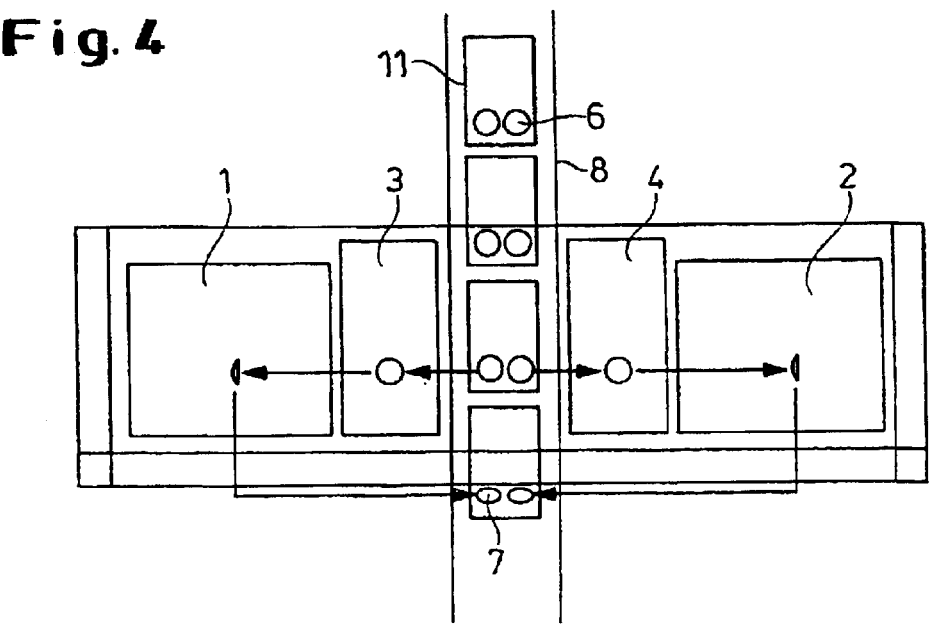
FIG. 4 shows a diagrammatic plan view of the installation in accordance with FIG. 3.

In the embodiment shown in FIGS. 3 and 4, the apparatuses 3, 4 for determining the optical values, etc., are disposed adjacent to the conveyor device 8, while in the embodiment in accordance with FIGS. 1 and 2 the processing machines 1, 2 are disposed adjacent to the conveyor device 8. The fundamental procedure is unaffected thereby.

In both examples of embodiment, the axes of the spectacle lens holding shafts of the two processing machines 1, 2 extend coaxially with one another, and the processing machines 1, 2 and the apparatuses 3, 4 for determining the optical values, etc., are disposed substantially in alignment and at right angles to the direction of movement of the conveyor device 8. It is however also possible to dispose the processing machine 1 and the apparatus 3 for determining the optical values, etc., and the processing machine 2 and the apparatus 4 for determining the optical values, etc., in a position rotated through 90° relative to the conveyor device 8, so that the axes of the spectacle lens holding shafts in the processing machines 1, 2 lie parallel to the direction of movement of the conveyor device 8.

The example of embodiment illustrated shows a double machine arrangement for the simultaneous processing of left-hand and right-hand spectacle lenses. However, the invention is not restricted thereto but also comprises embodiments having only one processing machine for the machining of spectacle lenses, one handling appliance and one apparatus for determining the optical values, the optical focus, the axial position of a cylindrical or prismatic polish, the position of a near portion and/or the position of the progression channel of a spectacle lens configured as a progressive lens, this apparatus either being connected to the processing machine via a data line or a device for the positionally and angularly accurate placement of a block or suction cup on the lens blank as a function of the recorded data on the lens blank being provided, so that the handling appliance may be a simple "pick-and-place" robot.

What is claimed is:

1. An apparatus or machining edges of a lens blank to form a spectacle lens, comprising:
   at least one CNC-controlled processing machine for machining the lens blank;
   at least one unit for measuring characteristics of the lens blank, the unit being operable to attach at least one of a suction cup and a block to the lens blank in a positionally and angularly correct location, the positionally and angularly correct location being determined in accordance with the characteristics of the lens blank measured by the unit; and
   at least one handling arrangement operable to remove the lens blank from a conveyor, to insert the lens blank into the unit for measuring the characteristics of the lens blank, to remove the lens blank from the unit for measuring the characteristics of the lens blank after the at least one of the suction cup and the block is attached to the lens blank, and to insert the lens blank with the at least one of the suction cup and the block attached thereto into the CNC-controlled processing machine for machining the lens blank into the spectacle lens.

2. The apparatus of claim 1, wherein the characteristics of the lens blank include at least one of optical values of the lens blank, an axial position of the lens blank, a prismatic polish of the lens blank, a position of a near portion of the lens blank, and a position of a progression channel of the lens blank.

3. The apparatus of claim 1, further comprising a guide for guiding the handling arrangement.

4. The apparatus of claim 1, wherein the at least one CNC-controlled processing machine includes a first CNC-controlled processing machine for machining a right-hand lens blank and a second CNC-controlled processing machine for machining a left-hand lens blank, the apparatus further comprising:
   a conveyor for transporting the left-hand and right-hand blanks to the apparatus, and for removing the left-hand and right-hand blanks from the apparatus after the first and second CNC-controlled processing machines respectively machine the left-hand and right-hand blanks into left-hand and right-hand spectacle lenses.

5. The apparatus of claim 4, wherein the at least one handling arrangement includes a first handling arrangement assigned to the first CNC-controlled processing machine for transporting the right-hand blank to and from the first CNC-controlled processing machine and a second handling arrangement assigned to the second CNC-controlled processing machine for transporting the left-hand blank to and from the second CNC-controlled processing machine.

6. The apparatus of claim 4, wherein the at least one unit includes a first unit for measuring characteristics of the right-hand lens blank and a second unit for measuring characteristics of the left-hand lens blank.

7. The apparatus of claim 4, wherein the first and second units are arranged adjacent to the conveyor.

8. The apparatus of claim 4, wherein the first and second CNC-controlled processing machine are arranged adjacent to the conveyor.

9. The apparatus of claim 4, wherein the first and second units and the first and second CNC-controlled processing machines are arranged adjacent to one another and in alignment with one another.

10. The apparatus of claim 4, wherein each of the first and second CNC-controlled processing machines comprises:

a slowly rotating spectacle lens holding shaft for holding a respective lens blank of the left-hand and right-hand lens blanks, the spectacle lens holding shaft having an axis; and a polishing disk arrangement positioned parallel to the axis of the spectacle lens holding shaft for polishing the respective lens blank;

wherein the axes of the spectacle lens holding shafts of the first and second CNC-controlled processing machines are parallel to one another.

11. The apparatus of claim 10, wherein the axes of the spectacle lens holding shafts of the first and second CNC-controlled processing machines extend parallel to the conveyor.

12. The apparatus of claim 10, wherein the axes of the spectacle lens holding shafts of the first and second CNC-controlled processing machines extend perpendicular to the conveyor.

13. The apparatus of claim 10, wherein the axes of the spectacle lens holding shafts of the first and second CNC-controlled processing machines are coaxial.

* * * * *